United States Patent [19]

Kim

[11] Patent Number: 5,181,029

[45] Date of Patent: Jan. 19, 1993

[54] ELECTRONIC KEYBOARD TEMPLATE

[75] Inventor: Jason S. Kim, Los Angeles, Calif.

[73] Assignee: AST Research, Inc., Irvine, Calif.

[21] Appl. No.: 699,506

[22] Filed: May 13, 1991

[51] Int. Cl.⁵ ............................................. G09G 3/00
[52] U.S. Cl. ....................................... 241/20; 341/22;
341/23; 364/709.1; 364/709.14; 364/709.15;
340/711
[58] Field of Search ............................ 341/23, 20, 22;
364/708, 709.01, 709.1, 709.11, 709.14, 709.15;
400/476, 479, 485, 456; 235/145 R; 340/711;
40/319

[56] References Cited

U.S. PATENT DOCUMENTS

| | | | |
|---|---|---|---|
| 4,870,604 | 9/1989 | Tatsuno | 364/708 |
| 4,890,832 | 1/1990 | Komaki | 341/23 X |
| 4,908,612 | 3/1990 | Bromley et al. | 340/711 X |
| 5,080,516 | 1/1992 | Ward | 400/719 X |

OTHER PUBLICATIONS

Microsoft Corporation, *Microsoft ® GW-Basic ® Interpreter User's Guide*, 1986, pp. 33-34.

*Primary Examiner*—Donald J. Yusko
*Assistant Examiner*—Michael Horabik
*Attorney, Agent, or Firm*—Knobbe, Martens, Olson & Bear

[57] ABSTRACT

An electronic keyboard template for use with software applications programs is responsive to command signals transmitted by designated function keys on a computer keyboard. The template includes an LCD display screen for displaying icons representative of operations performed by the function keys, control circuitry, and driving circuitry for generating the display of the icons on the LCD screen. In a preferred embodiment, the control circuitry includes a microprocesor, a Random-Access-Memory, and a digital Look-Up-Table, and the driving circuitry comprises a matrix driver and a refresh sequencer. The driving circuitry may further include a DC-to-DC convertor, and a plurality of shift registers for energizing pixel locations designated within a grid system on the LCD screen. In an alternative embodiment, the control circuitry may be external to the template (e.g., within the keyboard).

19 Claims, 6 Drawing Sheets

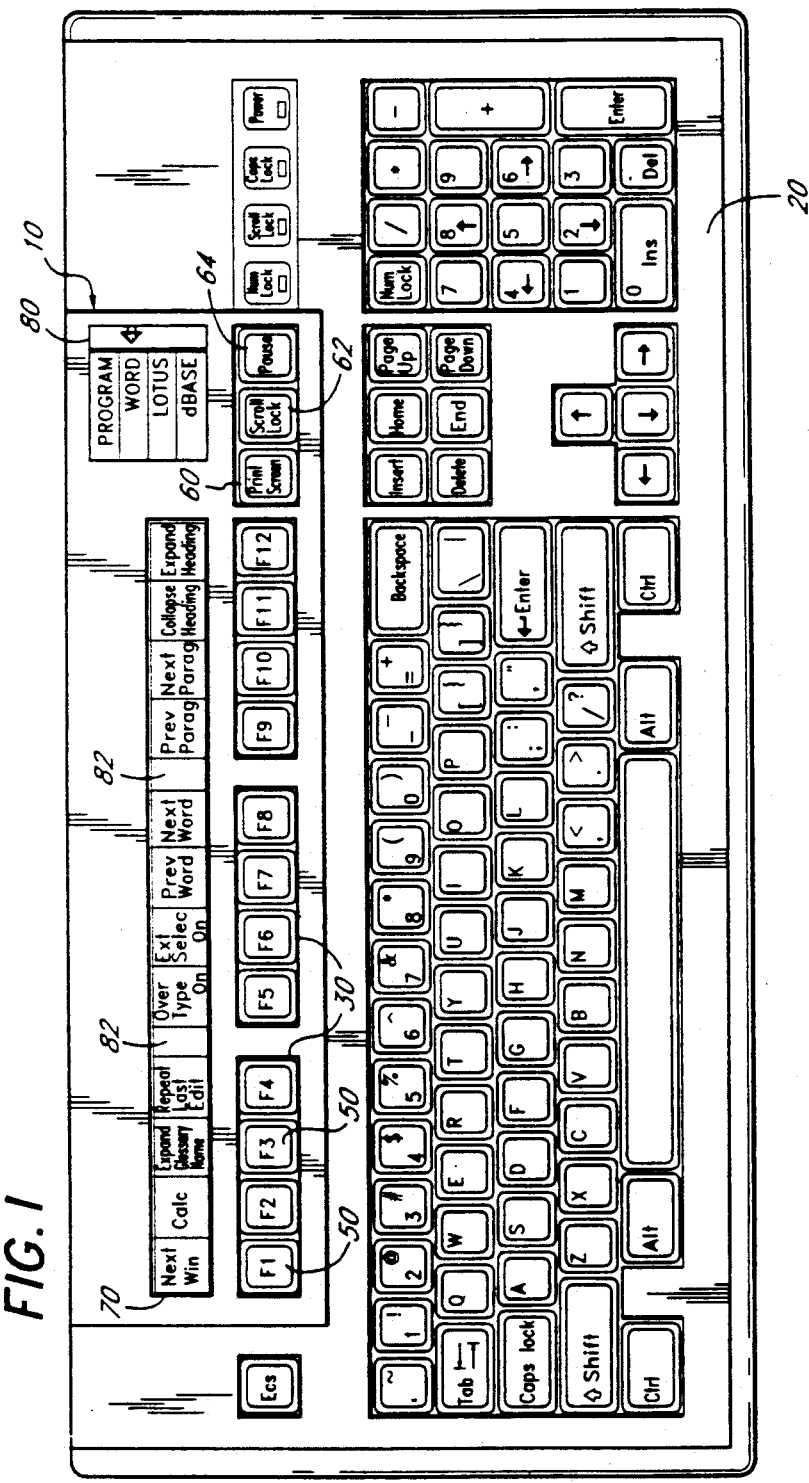
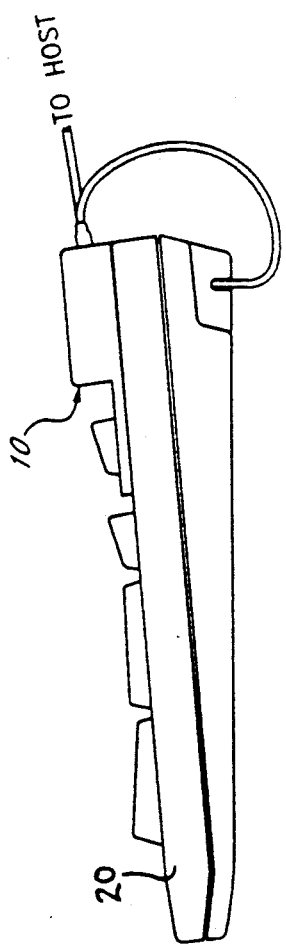
FIG. 1
FIG. 2

ELECTRONIC KEYBOARD TEMPLATE

FIELD OF THE INVENTION

The present invention relates to templates used to identify the operations performed by function keys on a computer keyboard.

BACKGROUND OF THE INVENTION

Computer keyboards used for inputting data into a computer are typically equipped with a set of "function keys" which, when depressed, cause the computer to perform pre-specified operations. For example, conventional computer keyboards are provided with a set of ten or twelve function keys, wherein each key is assigned a pre-specified function. Multiple functions may be assigned to a particular function key. This is usually accomplished by depressing any one of the CONTROL, SHIFT, or ALTERNATE keys in conjunction with the desired function key. In this way, a different operation is performed by the computer in response to the depression of the function key by itself, or of each combination of the desired function key and any one of the CONTROL, SHIFT, or ALTERNATE keys. Thus, four different function levels may be established for each function key.

Function keys are commonly used with a number of commercial software programs (e.g., word processing programs, spread sheet programs, database programs, etc.). Thus, different functions are generally assigned to each function key in accordance with the program which is run by the computer. That is, the pre-specified operation effected by depressing a particular function key while the computer is running one program, is likely to be different from the pre-specified operation effected by depressing the same function key when the computer is running another program.

In order to indicate which operations are assigned to each of the function keys, a template having abbreviated descriptions of the operations performed by each function key may be used. These templates are usually configured so as to overlay the keyboard such that the descriptions of each of the functions performed are adjacent to their appropriate function keys. For function keys that have multiple operations assigned to them, abbreviated descriptions for each of the assigned operations may be written onto the template, adjacent to the appropriate function key. For example, an exemplary template used in conjunction with the WordPerfect word processing program has abbreviations for four pre-specified operations inscribed adjacent to each function key when the template is placed on the keyboard.

It can be seen that conventionally made templates have a number of significant limitations. Namely, a separate template is required for each different commercial software program since the operations effected by each of the function keys will generally vary for different programs. In addition to this limitation, it is possible that the abbreviated descriptions for each function key (i.e., the descriptions provided by the template manufacturer) are not sufficiently detailed or that the notation employed is not meaningful for all users. Finally, it is also possible that a user may wish to specify his or her own operations to be carried out each time a particular function key is used. This is not provided for in conventional computer keyboards or templates since the operations effected by the function keys are pre-specified in accordance with the commercial software program that is being run by the computer.

Thus, a need exists for a computer keyboard template which may indicate the operations assigned to each function key for a plurality of different commercial software programs. A further need exists for a computer keyboard template which is capable of providing a custom set of abbreviated descriptions of each of the operations effected by the function keys on a computer keyboard. Finally, a need exists for a device which may be used to adapt the function keys on a computer keyboard so that a user specified set of operations are effected in place of the operations that are pre-specified within the software program being run by the computer.

SUMMARY OF THE INVENTION

The present invention is an electronic keyboard template which overcomes the limitations of prior computer keyboard templates. The template of the present invention is utilized in accordance with software applications programs which are responsive to command signals transmitted by designated function keys on a computer keyboard. The template comprises a display screen for displaying icons representative of operations performed by the function keys, and also comprises driving circuitry for generating the display of the icons on the screen in response to control signals. In one embodiment, the control signals are generated by control circuitry (e.g., a microprocessor) within the keyboard.

In an alternative embodiment, the template includes control circuitry for generating the control signals which control the display of the icons on the display screen so that the template acts as a "stand-alone" unit which requires no special programming of the keyboard control circuitry. In a preferred embodiment of the invention, the control circuitry comprises a microprocessor, a Random-Access-Memory, and a digital Look-Up-Table. In a particularly preferred embodiment, the Look-Up-Table within the "stand-alone" template stores digital values representative of the icons to be displayed on the screen.

In preferred embodiments, the display screen comprises an LCD screen, and the driving circuitry comprises a matrix driver and a refresh sequencer. The driving circuitry may further comprise a DC-to-DC convertor, and a plurality of shift registers for energizing pixel locations designated within a grid system on the display screen.

Preferably, the template includes selector circuitry for selecting a predefined set of the icons wherein the set of icons is appropriate for use with a given one of the software applications programs.

Preferably, the template of the present invention also comprises program circuitry for defining a user designated set of the icons.

BRIEF DESCRIPTION OF THE DRAWINGS

FIG. 1 is a top plan view of the template of the present invention overlaid onto the function keys of a conventional computer keyboard.

FIG. 2 is a side elevational view of the template of the present invention overlaid onto a conventional computer keyboard.

DETAILED DESCRIPTION OF THE INVENTION

Figure 3:
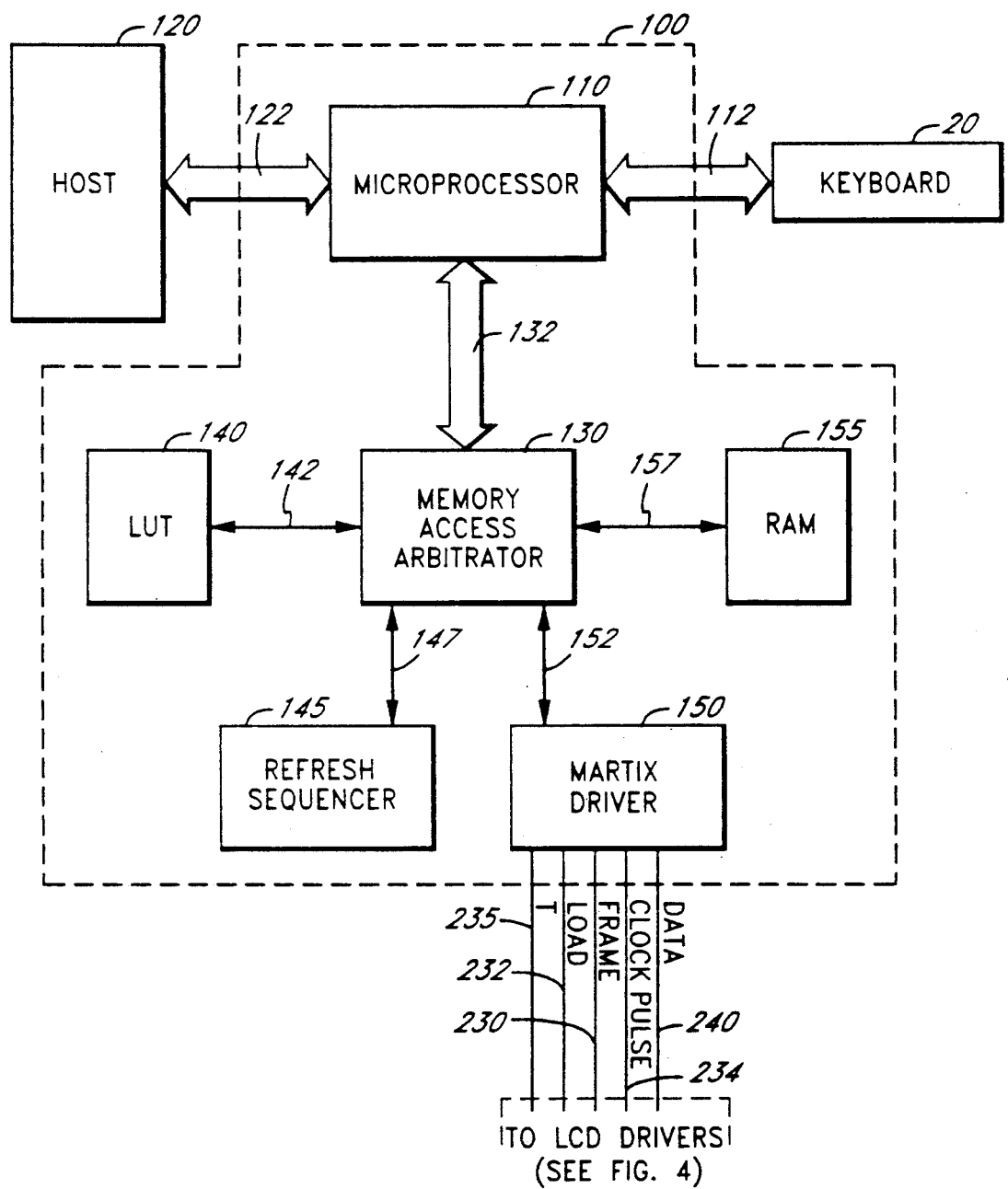
FIG. 3 is a functional block diagram illustrating the functions of the general circuit elements of a display controller within the electronic template.

FIGS. 1 and 2 are top and side views, respectively, of one embodiment of an electronic keyboard template 10, made in accordance with the present invention. The template 10 is shown overlaid onto a computer keyboard 20 such as a keyboard used with a conventional Industry Standard Architecture (ISA) computer (e.g., a PC/AT compatible computer system), or any other conventional computer keyboard. The template 10 includes rectangular apertures 30 which are advantageously formed to receive multiple function keys 50 (F1-F12), as well as a PRINT SCREEN key 60, a SCROLL LOCK key 62, and a PAUSE key 64. The template 10 also includes a liquid crystal display (LCD) screen 70 directly above the rectangular apertures 30 that receive the function keys 50. The screen 70 may, for example, be an ALPS ® full dot matrix LCD module, Product No. LSSHA203XA. The template 10 further includes a program selector 80.

The LCD screen 70 advantageously extends above the function keys 50 along their entire length. In the embodiment shown, the screen 70 is 640 pixels long (corresponding to a length of 250 mm), by 64 pixels wide (corresponding to a length of 20 mm). An area on the LCD screen 70 is designated for each of the function keys 50, so that each of the designated areas is proximate to (i.e., directly above) the function key 50 which it corresponds to. Two bands 82 on the screen 70 directly above the two spaces between the three sets of function keys 50 are blank. The bands are each approximately 20 pixels wide so that a total of 600 pixels are used along the length of the screen 70. Thus, if twelve function keys are employed, an area of approximately fifty pixels by fifty pixels will be designated for each function key 50.

Selected pixels on the LCD screen 70 may be energized so as to appear darker than the surrounding pixels. By energizing the appropriate pixels, letters, words or graphics (e.g., icons) may be displayed within each of the designated 50-pixel by 50-pixel areas. In this way, the template 10 is capable of providing abbreviated descriptions for each of the operations effected by the function keys 50 on the LCD screen 70.

The program selector 80 is used to select the desired software program to be used in conjunction with the template 10. For example, the program selector 80 may be set so that the template 10 is able to be used, for example, with a WordPerfect word processing program, a Lotus 1-2-3 spreadsheet program, a dBase III database program, or numerous other commercially available software programs that utilize the function keys. The abbreviated descriptions displayed on the screen 70 may be modified in accordance with the selected software applications program. The program selector 80 may also be switched into a PROGRAM mode.

The PROGRAM mode allows a user to define a custom set of functions for each of the function keys 50. That is, the user may assign a specified series of keystrokes to a given function key so that each time that function key is depressed the specified keystrokes are performed. For example, a user may wish to save, replace and exit a document with the touch of a single function key. In the PROGRAM mode, the user is able to define, or reconfigure, a function key using the appropriate keystrokes necessary to perform the desired functions. This allows a user to save time when the same complex procedures are to be used frequently while a particular software program is being run.

The PROGRAM mode also allows the user to compose a custom set of abbreviated descriptions to be displayed on the screen 70 for each of the function keys 50 that the user defines. For example, abbreviated descriptions for each of the function keys 50 used with the Lotus, Wordperfect, and dBase software programs may also be defined by the user.

Preferably, the electronic keyboard template 10 is controlled by a special keyboard template driver which is advantageously implemented as software within a host computer to the keyboard 20. The template driver software may be implemented as a so-called terminate and stay resident (TSR) program which is loaded into the computer system prior to loading and running an application program. Generally, the TSR program runs in the background and does not interfere with the normal operation of the application program. An exemplary TSR program may include a number of so-called "hot keys" which enable the TSR program to be temporarily brought to the foreground so that the user may interact with the TSR program.

The template driver software may be activated by a signal from the template 10. The software advantageously intercepts signals transmitted from the keyboard, via the template 10, and evaluates these signals to determine if they correspond to the signals normally output by a given function key. The software then determines if the particular function key has been reconfigured, within the program mode, by a user. If a user-reconfigured function key has been depressed, the template driver software mimics those signals which would have been sent by the user defined keystrokes. Thus, the template driver software causes a reconfigured function key to resemble a set of user defined keystrokes. The operations of TSR programs that intercept predetermined keystrokes are well-known in the art and will not be described in detail herein.

In addition to reconfiguring selected signals which are output from the keyboard 20 via the template 10, the template driver software may also transmit signals to the template 10 which cause a change to occur in the output of the display screen 70. These changes are effected by display control circuitry which may be implemented within the template 10, or alternately, may be implemented as an integrated system within a programmable microcontroller already present within the keyboard 20.

FIG. 3 is a functional block diagram that shows the functions of the general circuit elements of a display controller 100 within the electronic template 10. Note that the block diagram shown in FIG. 3 is functional so that a one-to-one correspondence does not necessarily exist between function blocks and hardware. In a preferred embodiment, these functional elements may be implemented within an INTEL® 80C51 microcontroller. The display controller 100 controls the output display on the screen 70.

The controller 100 includes a microprocessor block 110, which is electrically connected to the keyboard 20 via a bus 112. The microprocessor 110 is also connected to the CPU of a host computer 120 via a bus 122. The microprocessor block 110 receives, processes, and transmits data to and from the keyboard 20 and the host 120. The microprocessor 110 is also connected to a memory access arbitrator function block 130 via a bus 132.

The memory access arbitrator 130 selectively interconnects the microprocessor 110 with one of a plurality of functional memory or driving elements. As shown, the memory access arbitrator 130 is connected to a Look-Up-Table (LUT) 140 via a line 142, to a refresh sequencer 145 via a line 147, to a matrix driver block 150 via a line 152, and to a random access memory (RAM) 155 via a line 157. Thus, the memory access arbitrator 130 may selectively interconnect the microprocessor 110 with any one of the Look-Up-Table 140, the refresh sequencer 145, the matrix driver 150, or the RAM 155.

In conventional communications from a host computer to a keyboard in an ISA computer system, the host computer issues a "reset" command (i.e., sends a data byte having a hexadecimal value of "FF") to the keyboard upon power-up. A standard keyboard would then "acknowledge" the reset request (i.e., send a data byte having a hexadecimal value of "FA" back to the host computer) and proceed to conduct conventional initialization and self tests. However, the display control circuitry 100 within the template 10 of the present invention responds with a "repeat" command (i.e., send a hexadecimal value of "FE" to the host computer). For a standard host computer not programmed in accordance with the present invention, reception of a repeat command ("FE") indicates that an error has occurred in the initial communication and the host again transmits a "reset" command ("FF"). However, the enhanced host computer 120 (i.e., a computer having the template driver software loaded as a TSR program) receives the repeat command ("FE") and, in response, transmits a "change default" command (a hexadecimal value "F5") by means of the template driver software which intercepts the communications between the keyboard and the conventional keyboard handling software in the host computer 120.

The microprocessor 110 in the display controller 100 selects one of two modes in response to the signal generated by the host computer 120. If the host computer 120 transmits another reset command ("FF"), this indicates that the host computer 120 is not equipped with the template driver software. The microprocessor 110 disables the template 10 so that the template 10 effectively becomes "transparent." That is, the template 10 is switched to a repeater mode wherein all of the signals transmitted from the keyboard 20 are repeated by means of the circuitry (e.g., the microprocessor 110) within the template 10 and communicated to the keyboard 20 without modification. Thus, in the "transparent" mode, the template 10 is disabled, and the keyboard 20 and host 120 interact as a normal keyboard/host system. If, however, the host computer 120 transmits a "change default" command ("F5"), this indicates that the host 120 is enhanced with the template driver software so that the display controller 100 within the template 10 is enabled to drive the LCD screen 70.

When the display control circuitry 100 within the template 10 is enabled, data to be displayed on the LCD screen 70 is transferred to a display buffer which is implemented as the RAM 155. In one embodiment, the RAM 155 has approximately 5 Kbytes of memory storage which is sufficient to control each of the pixels of the LCD screen 70 (1 bit per pixel). The data is downloaded from the host computer 120 to the RAM 155. The matrix driver 150 generates timing signals similar to those used for raster scanning of an electron beam on the face of a CRT. These timing signals are implemented as data pulses within row and column shift registers described below.

Figure 4:
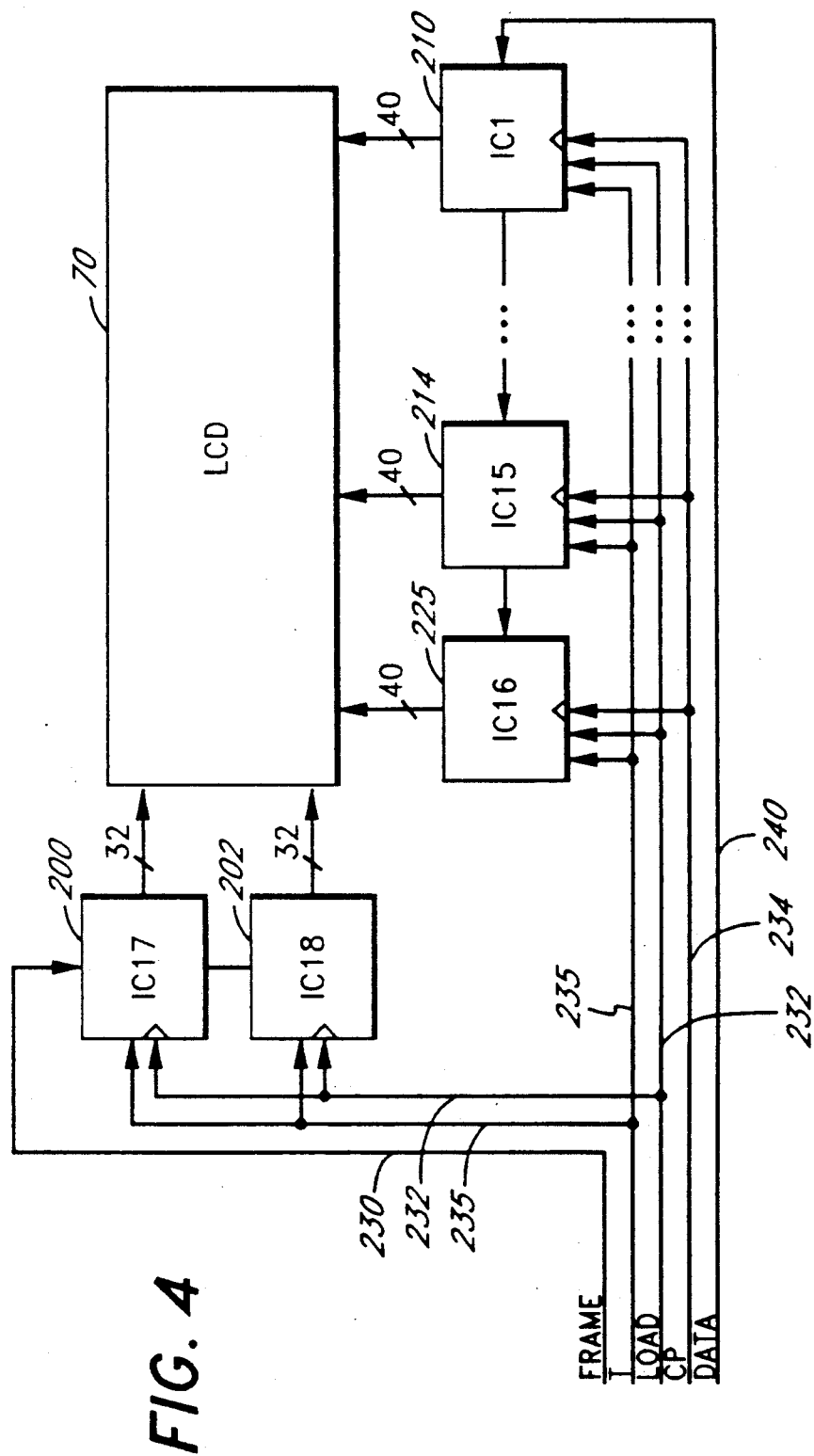
FIG. 4 is a block diagram showing the general layout of the shift registers used to load the LCD screen.
Figure 5:
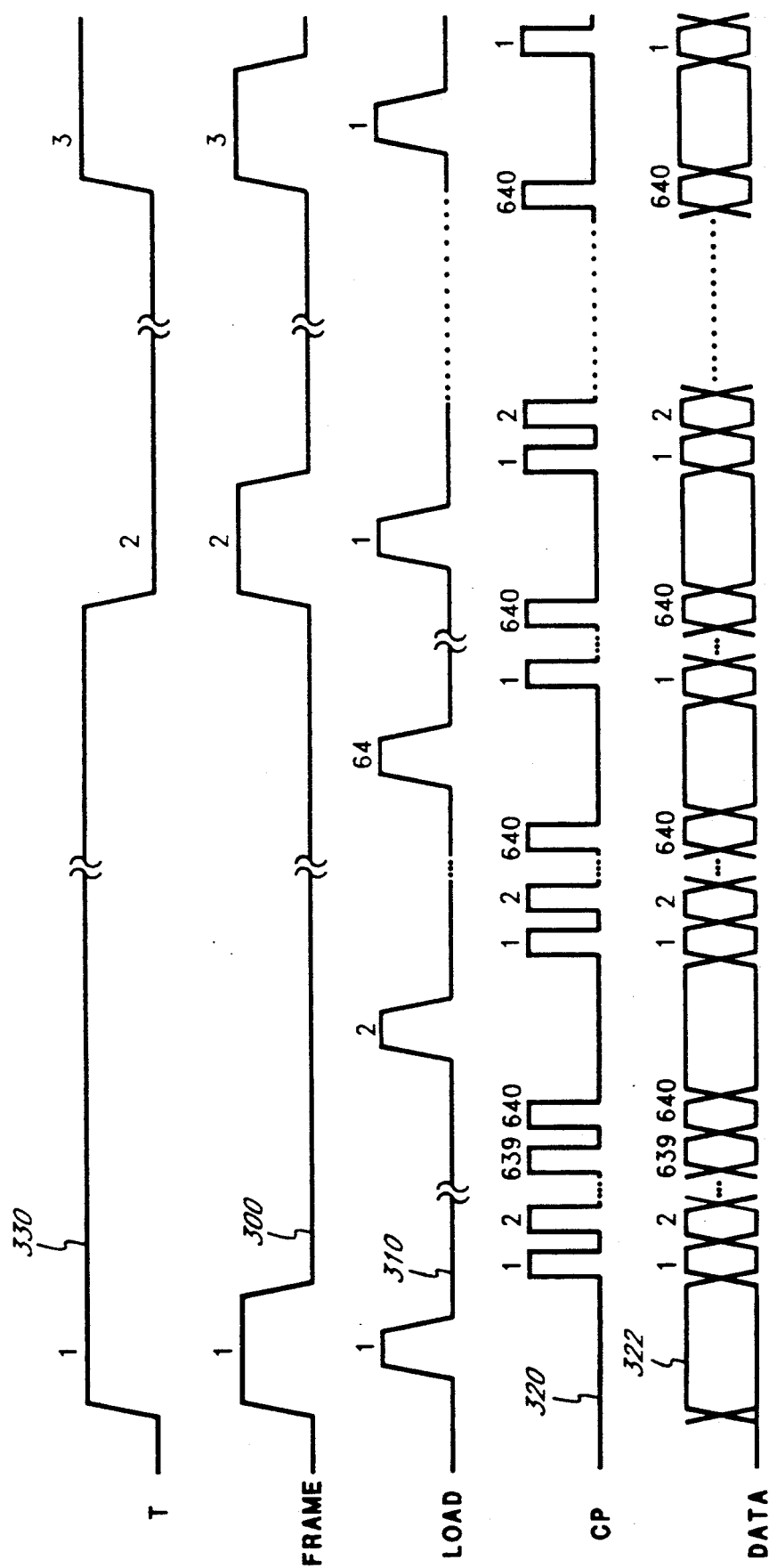
FIG. 5 illustrates timing diagrams which show the timing relationships between the signals transmitted from the matrix driver.

FIGS. 4-6 illustrate how the data is transferred from the display buffer RAM 155 to the LCD screen 70. FIG. 4 is a block diagram showing the general lay-out of the shift registers used to load the LCD screen 70. Two 32-bit column shift registers 200, 202 are connected serially to act as a single 64-bit register. The column shift registers 200, 202 may, for example, be implemented as MSM5238 shift registers, available from OKI Semiconductor, Inc. Sixteen 40-bit row shift registers 210-225 are also connected in series to act as a single 640-bit shift register. The row shift registers 210-225 may be implemented as MSM5839 shift registers, also available from OKI Semiconductor, Inc. Frame and Load signals are fed to the column registers 200, 202 via lines 230, 232 respectively. A Load signal and a synchronous clock pulse (CP) signal are fed to the row shift registers 210-225 via signal lines 232, 234, respectively, while data signals are fed to the first shift register 210 along a signal line 240. The Frame, Load, CP, and Data signals are all generated by the matrix driver 150.

An LCD toggle signal (designated as T in FIGS. 3 and 4) is also generated by the matrix driver 150, and is transmitted to column registers 200, 202 as well as to the row registers 210-225 via a line 235. The toggle signal (T) permits the LCD screen to be refreshed at each cycle of the Frame pulse. The toggle signal is necessary because each time a pixel is energized by a signal of a first polarity (i.e., positive or negative), the crystal molecules within the display pixel become polarized so that the pixel propagates light (i.e., becomes effectively transparent). Once a pixel has been polarized, a subsequent polarizing signal of the opposite polarity to the previous is necessary to effect a change in the orientation of the crystal molecules within the display pixel to cause the pixel to appear opaque. Thus, after each frame, those pixels which have been polarized must be de-polarized during the next frame so that they appear darker than the surrounding pixels. The function of the toggle signal is to cause the active pixels to be de-polarized during each frame. The toggle pulse alternates between a logic one and logic zero to cause drivers in the shift registers IC1-IC18 to generate drive voltages that alternate positively and negatively in synchronization with the Frame pulse so that the active pixels within the LCD screen 70 are de-polarized in each new display frame. Only the active pixels are de-polarized.

The inactive pixels remain polarized and propagate light so that they are not opaque.

FIG. 5 illustrates timing diagrams which show the timing relationships between each of the signals transmitted from the matrix driver 150. The Frame pulse signal (timing diagram 300) may be likened to a vertical sync pulse of a raster scan because a Frame pulse is generated once at the beginning of each frame of data on the LCD screen 70. Between each Frame pulse, 64 Load pulses (timing diagram 310) are generated on the Load signal line 232. Each Load pulse acts as a horizontal sync pulse in that it causes data to be written on a successive line of the LCD screen 70. Between each Load pulse, 640 clock pulses (timing diagram 320) are generated in synchronization with 640 successive bits of data (timing diagram 322) along the CP signal line 234 and the Data signal line 240, respectively. The toggle pulse signal (timing diagram 330) comprises alternate logic one and logic zero pulses in synchronization with each Frame pulse. Basically, the data bits are fed in serially, beginning at the register 210, and are shifted to the left at each clock pulse until the 640 memory spaces along the row registers 210-225 are full. These bits are then parallel loaded to the LCD screen 70 as one entire line which is displayed in accordance with the currently activated row as determined by the number of Load pulses that have occurred since the last Frame pulse.

Figure 6A:
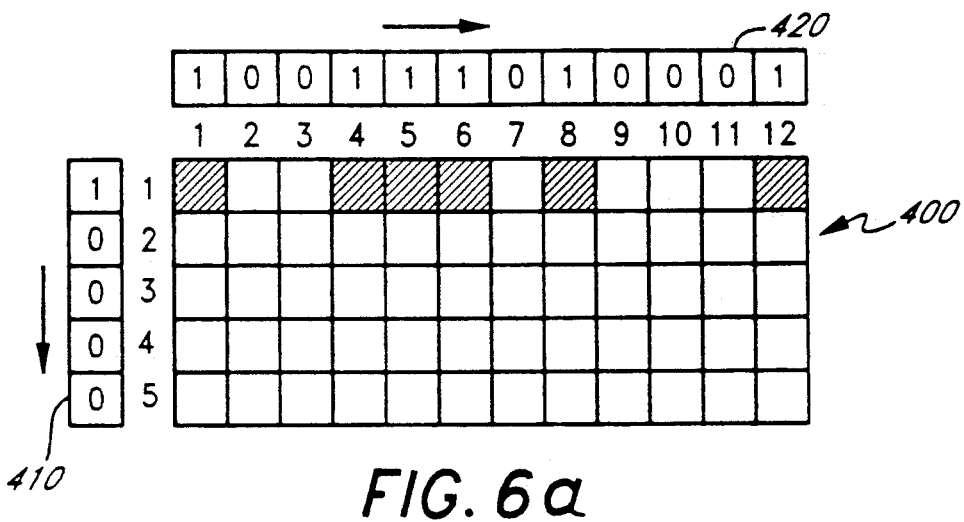
FIGS. 6A-6C illustrate a simplified pictorial example of how the entire contents of the display buffer RAM are loaded to the LCD screen.
Figure 6B:
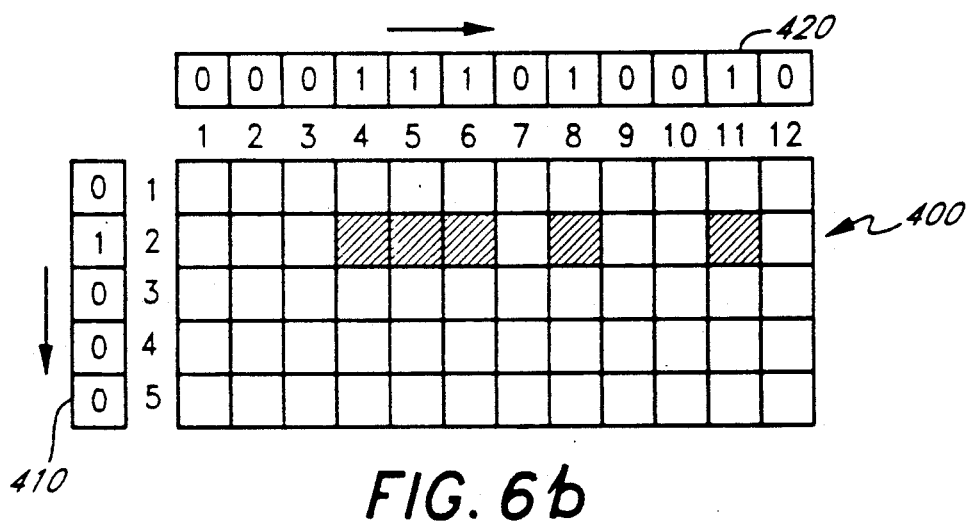
Figure 6C:
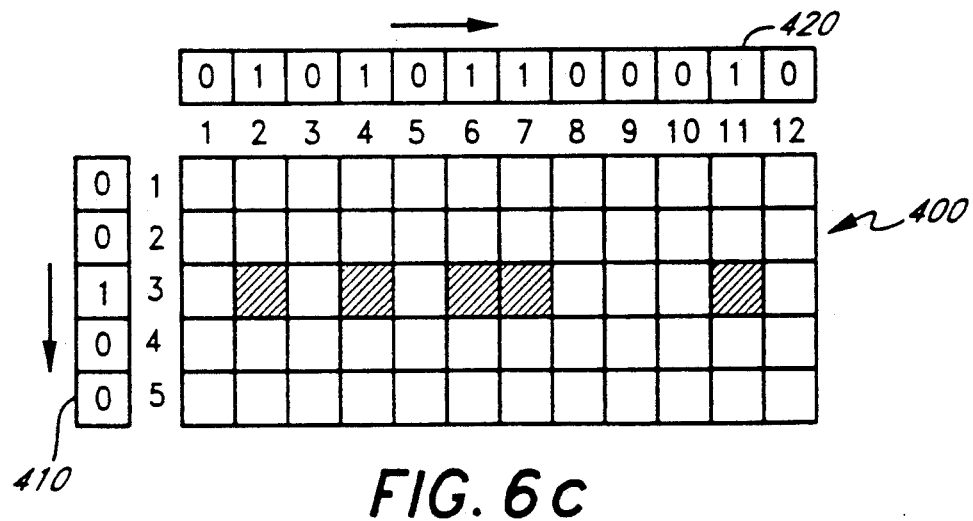

FIGS. 6A-6C illustrate a simplified pictorial example of how the entire contents of the display buffer RAM 155 are loaded to the LCD screen 70. FIGS. 6A-6C show a 5-row × 12-column LCD screen 400. To the left of the screen 400 is a 5-bit shift register 410, and above the screen 400 is a 12-bit shift register 420. Initially, both registers 410, 420 are empty (i.e., all zero's). Once a Frame pulse is transmitted to the 5-bit register 410, the Frame pulse is accepted as a digital "1" and shifted into the first memory location of the register 410 (FIG. 6A). Immediately thereafter, a series of data bits are shifted into the 12-bit register in synchronization with a series of clock pulses (that is, one data bit is shifted in at the trailing edge of each clock pulse). For example, as shown in FIG. 6A, digital ones may be shifted into the 1st, 4th-6th, 8th and 12th memory locations. Once all of the data bits have been shifted into the 12-bit register 420, a Load pulse is transmitted which causes the parallel down-loading of the digital bits from the 12-bit register 420 to the first line of the LCD screen 400 (i.e., the line which is enabled by the digital "1" in the 5-bit shift register 410). The Load pulse also effects a shift in the 5-bit register 410 so that the digital "1" is shifted to position 2 as shown in FIG. 6B. Following the shifting of the digital "1" into the second position of the 5-bit shift register 410, another 12 clock pulses cause another 12 data bits to be shifted into the parallel loaded to the LCD screen 400 in response to the Load pulse (this time the data are loaded to the second line, which is the line enabled by the digital "1" present in the second memory location of the register 410). Finally, the digital "1" is shifted (also in response to the Load pulse) from the second to the third memory location of the 5-bit register 410 (FIG. 6C). This process repeats until all of the lines of the LCD screen 400 have been illuminated at the appropriate pixels. The digital "1" is then shifted out of the last memory location. When a new Frame pulse is transmitted, a digital "1" is again shifted into the first memory location and the above described process repeats.

The general procedure described above for a 5×12 LCD screen 400 may also be employed with the 64×640 LCD screen 70. Of course, the procedure may be slightly modified to insure that the display is sufficiently illuminated. The refresh sequencer 145 (FIG. 3) may be employed to "refresh" the pixels every 1/30 of one second so that a sufficient pixel intensity is maintained. In one embodiment, a 5-volt to 14-volt DC-to-DC convertor (not shown) is used within the display controller circuitry 100 to provide a sufficiently high voltage for driving the LCD screen 70 using the 5-volt power supply from the host 120.

The illuminated pixels may be arrayed to produce a display which is in accordance with the user defined or pre-programmed descriptions to be displayed. As stated previously, selected pixels on the LCD screen 70 may be energized so as to appear darker than the surrounding pixels. By energizing the appropriate pixels, letters and/or words may be displayed within each of the designated 50 pixel by 50 pixel areas. Thus, the template 10 is capable of providing abbreviated descriptions for each of the operations effected by the function keys 50 on the LCD screen 70. In one embodiment, the abbreviated descriptions for each of the pre-programmed function keys are stored as data in the Look-Up-Table 140. In a particularly advantageous embodiment, descriptions are stored for all of the function keys used in each of the available applications programs listed on the program selector 80. For example, if a WordPerfect word processing program is selected (i.e., the program selector 80 is positioned at the WordPerfect setting), then the Look-Up-Table 140 transfers data to the display buffer RAM 155. This data would be appropriate to display an abbreviated description of each function key as used in the WordPerfect program. Furthermore, the descriptions used for all four function levels (i.e., the normal level in addition to the levels employed in conjunction with the ALT, SHIFT, and CTRL keys), are stored within the Look-Up-Table 140. In an alternative embodiment, the data corresponding to the function key descriptions may be stored within the host 120.

In order to bring up the descriptions for separate function levels, the user need only press the key which designates the desired level. For example, if a user wants to see the functions enabled by depressing the SHIFT key in conjunction with any of the function keys 50, the user holds down the SHIFT key by itself for approximately one-half second. The keyboard 20 transmits a signal indicating that the SHIFT key has been depressed to the display control circuitry 100. The microprocessor 110 then transmits a signal to the memory access arbitrator 130 which causes the appropriate data (i.e., that data which represents the descriptions for the SHIFT function level) to be transferred from the Look-Up-Table 140 to the display buffer RAM 155. This data is then processed via the matrix driver 150 and displayed on the LCD screen 70.

Data that represents the custom (i.e., user defined) set of function descriptions may be stored within the host 120 by means of the template driver software. When it is desired to call up a custom set of descriptions (e.g., those defined for the already extant application programs listed on the program selector 80, or those defined within the PROGRAM mode of the program selector 80), the user presses a particular "hot key" combination. The keyboard 20 then transmits a signal to the template 10 indicating that the selected "hot key" combination has been depressed. This signal is received by the microprocessor 110, which in turn transmits a signal to the host computer 120. The enabled template driver software, upon receiving notification that the appropriate "hot keys" have been depressed, then transmits the custom display data back to the display control circuitry 100. This data is then transferred to the display buffer RAM 155, and, ultimately, to the LCD screen 70 as the desired set of descriptions.

Figure 7:
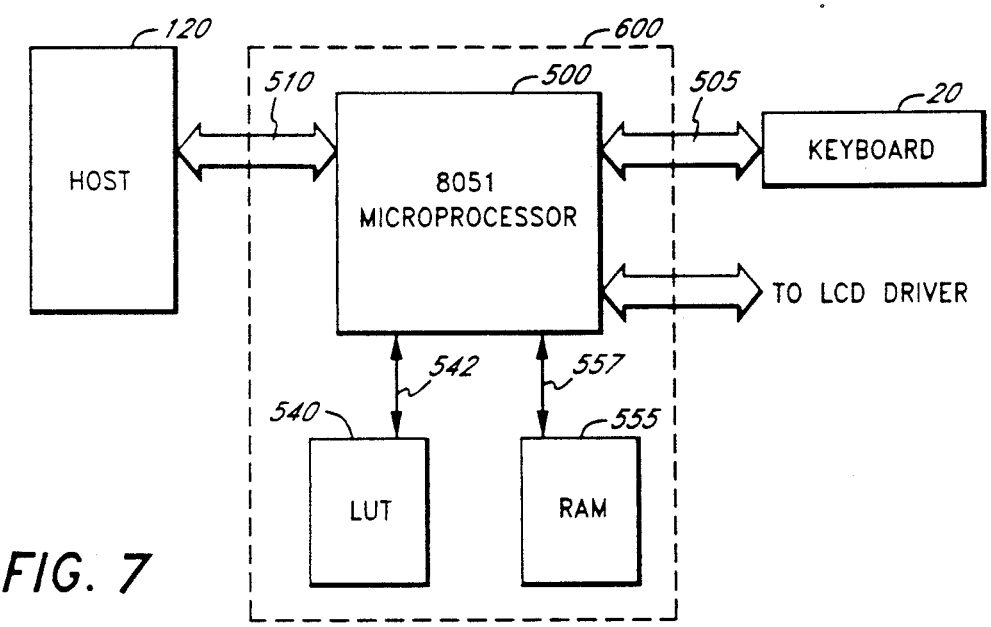
FIG. 7 is a block diagram showing the basic circuit elements used in one embodiment of the present invention.

FIG. 7 is a block diagram showing the basic circuit elements used in one embodiment of the present invention. The keyboard 20, and the host 120 are identical to those shown in the function block diagram in FIG. 3. The keyboard 20 and the host 120 are electrically connected to a microprocessor 500 via bus lines 505 and 510 respectively. The microprocessor 500, may, for example be an Advanced Micro Devices 80C51 microcontroller. In one embodiment, the microprocessor 500 performs the functions of the microprocessor block 110, the matrix driver 150, and the refresh sequencer 145 (all shown in FIG. 3). The functions of the Look-Up-Table 140, and the RAM 155 may be advantageously performed by hardware external to the microprocessor 500, namely, a Look-Up-Table 540 and a RAM 555 which are respectively connected to the microprocessor 500 via signal lines 542 and 557. Thus, the display control circuitry 100 may be advantageously implemented as standalone hardware (generally designated as 600 in FIG. 7) within the template 10.

Figure 8:
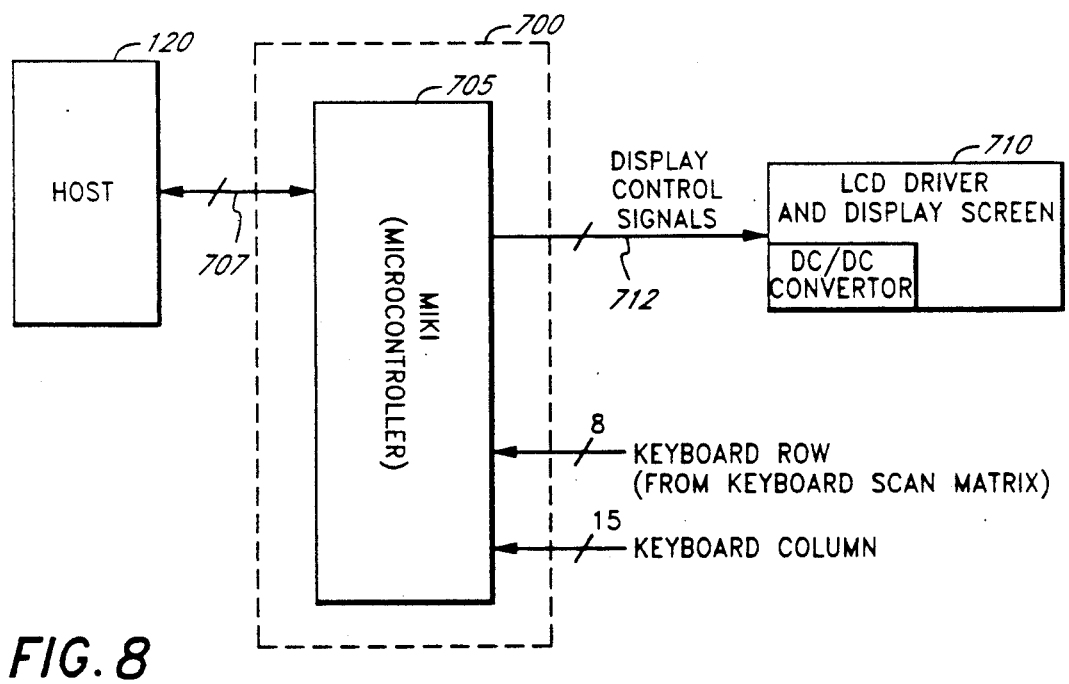
FIG. 8 shows an alternative embodiment wherein the display control circuitry is implemented within the processing and control hardware which is already extant within the keyboard.

In an alternative embodiment, the display control circuitry may be implemented within the processing and control hardware which is already extant within the keyboard 20. In this embodiment, shown in FIG. 8, the LCD driver (including the shift registers 200, 202, and 210-225), a 5-volt to 14-volt DC-to-DC convertor 650, and the LCD screen 70 are the only hardware necessary to be implemented within the template 10. The keyboard 20 is designated by a dashed line, and, in an exemplary embodiment, includes conventional scan matrix circuitry (not shown) as well as a microcontroller 705 (e.g., a microcontroller keyboard interface (MIKI) ASIC produced by AST Research, Inc.). The microcontroller 705 receives inputs from the keyboard scan matrix circuitry as well as from the host 120 via a data bus 707. In response, the microcontroller 705 generates control signals appropriate to drive the LCD screen 70 within the template 10, and transmits these signals to the template 10 along a data bus 712. In this embodiment, the template 10 advantageously employs the system memory provided by the host 120.

The invention may be embodied in other specific forms without departing from its spirit or essential characteristics. For example, the template of the present invention may be configured for a plurality of different keyboards (e.g., for use with keyboards having 10 function keys instead of 12). The described embodiments are to be considered in all respects as illustrative and not restrictive. The scope of the invention is, therefore, indicated by the appended claims rather than by the foregoing description. All changes which come within the meaning and range of equivalency of the claims are to be embraced within their scope.

What is claimed is:

1. An electronic keyboard template for use with software applications programs in a computer system comprising a primary display screen, said programs being responsive to command signals transmitted by designated keys on a computer keyboard, said template comprising:

a template display screen separate from said primary display screen and positioned proximate to and aligned with said designated keys, said template display screen displaying icons representative of operations performed in response to command signals from said designated keys; and driving circuitry that generates said icons on said template display screen in response to control signals.

2. The electronic keyboard template as defined in claim 1, wherein said designated keys are the function keys of the keyboard.

3. The electronic keyboard template as defined in claim 1, wherein said icons displayed on said template display screen change when one of a SHIFT key, a CTRL key or an ALT key is depressed on said computer keyboard.

4. The electronic keyboard template as defined in claim 1, wherein said template display screen comprises an LCD screen.

5. The electronic keyboard template as defined in claim 1, further comprising control circuitry for generating said control signals which control the display of said icons on said template display screen.

6. The electronic keyboard template as defined in claim 5, wherein said control circuitry comprises a microprocessor.

7. The electronic keyboard template as defined in claim 1, wherein said icons are selectable by said applications programs.

8. An electronic keyboard template for software applications programs, said programs being responsive to command signals transmitted by designated keys on a computer keyboard, the template comprising:

a display screen for displaying icons representative of operations performed in response to command signals from said designated keys;

driving circuitry for generating the display of said icons on said screen in response to control signals; and control circuitry for generating said control signals which control the display of said icons on said display screen, said control circuitry comprising a microprocessor and a Random-Access-Memory and a digital Look-Up-Table.

9. The electronic keyboard template as defined in claim 8, wherein said Look-Up-Table stores digital values representative of said icons to be displayed on said screen.

10. An electronic keyboard template for software applications programs, said programs being responsive to said command signals transmitted by designated keys on a computer keyboard, said template comprising:

a display screen for displaying icons representative of operations performed in response to command signals from said designated keys; and driving circuitry for generating the display of said icons on said screen in response to control signals, said driving circuitry comprising a matrix driver and a refresh sequencer.

11. The electronic keyboard template as defined in claim 10, wherein said driving circuitry further comprises a DC-to-DC convertor.

12. The electronic keyboard template as defined in claim 10, wherein said driving circuitry further comprises a plurality of shift registers for energizing selected regions of said display screen.

13. The electronic keyboard template as defined in claim 12, wherein said selected regions of said display screen are pixel locations designated with in a grid system on said display screen.

14. An electronic keyboard template for use with software applications programs, said programs being responsive to command signals transmitted by designated keys on a computer keyboard, said template comprising:
   a display screen for displaying icons representative of operations performed in response to command signals from said designated keys;
   driving circuitry for generating the display of said icons on said screen in response to control signals, said
   selector circuitry for selecting a predefined set of said icons, said set of icons being appropriate for use with a given one of said software applications programs.

15. An electronic keyboard template for use with software applications programs, said programs being responsive to command signals transmitted by designated keys on a computer keyboard, said template comprising:
   a display screen for displaying icons representative of operations performed in response to command signals from said designated keys;
   driving circuitry for generating the display of said icons on said screen in response to control signals; and
   program circuitry for defining a user designated set of said icons.

16. An electronic keyboard template for use with software applications programs, said programs being responsive to command signals transmitted by designated function keys on a computer keyboard, said template comprising:
   an LCD display screen for displaying icons representative of operations performed by said function keys, said LCD screen having pixel locations designated within a grid system on said display screen;
   control circuitry for generating control signals which control the display of said icons on said display screen, said control circuitry comprising a microprocessor, a Random-Access-Memory and a digital Look-Up-Table wherein said Look-Up-Table stores digital values representative of said icons to be displayed on said screen; and
   driving circuitry for generating the display of said icons on said screen in response to said control signals, said driving circuitry comprising a matrix driver, a refresh sequencer, and a plurality of shift registers for energizing said pixel locations of said display screen.

17. An electronic keyboard template for use with software applications programs in a computer system comprising a primary display screen, said programs being responsive to command signals transmitted by designated function keys on a computer keyboard, said software programs being operated within a host computer, said template comprising:
   a template display screen separate from said primary display screen and positioned proximate to and aligned with said designated keys, said template display screen displaying icons representative of operations performed in response to command signals form said designated keys;
   interceptor circuitry for receiving signals transmitted from said host computer and generating an activation signal in response thereto; and
   enable circuitry for enabling said template in response to a first mode of said activation signal, and disabling said template in response to a second mode of said activation signal.

18. The electronic keyboard template as defined in claim 7, wherein said host computer selects said icons when said template is enabled.

19. An electronic keyboard template for use with software applications programs, said programs being responsive to command signals transmitted by designated function keys on a computer keyboard, said software programs being operated within a host computer, said template comprising:
   interceptor circuitry for receiving signals transmitted from said host computer and generating an activation signal in response thereto;
   enable circuitry for enabling said template in response to a first mode of said activation signal, and disabling said template in response to a second mode of said activation signal; and
   repeater circuitry for repeating signals received from said keyboard and said host when said template is disabled.

* * * * *

UNITED STATES PATENT AND TRADEMARK OFFICE
CERTIFICATE OF CORRECTION

PATENT NO. : 5,181,029

DATED : January 19, 1993

INVENTOR(S) : Jason S. Kim

It is certified that error appears in the above-identified patent and that said Letters Patent is hereby corrected as shown below:

In Column 10, Line 51, between "for" and "software" insert

--use with--

In Column 11, Line 3, change "with in" to --within--

In Column 11, at Lines 15 and 16, change "signals, said" to and--

--signals;

In Column 12, Line 21, change "form" to --from--

Signed and Sealed this

Seventh Day of December, 1993

Attest:

BRUCE LEHMAN

*Attesting Officer*   *Commissioner of Patents and Trademarks*